June 1, 1965  ISAMU KUBOTA ETAL  3,187,341
BATTERY POWERED MOTION PICTURE CAMERA WITH REMOTE CONTROL
Filed Dec. 5, 1962  2 Sheets-Sheet 2
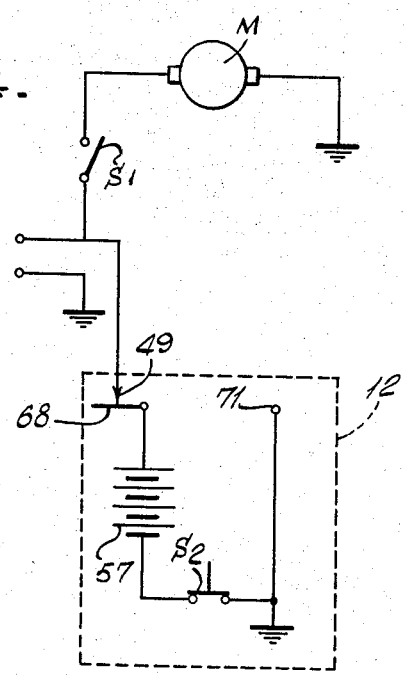
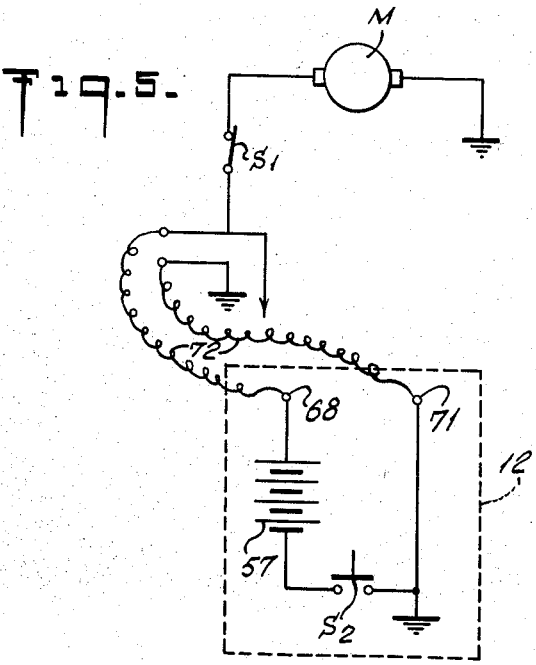
INVENTORS
ISAMU KUBOTA
TAKESI ATAKA
BY Stanley Wolder
ATTORNEY

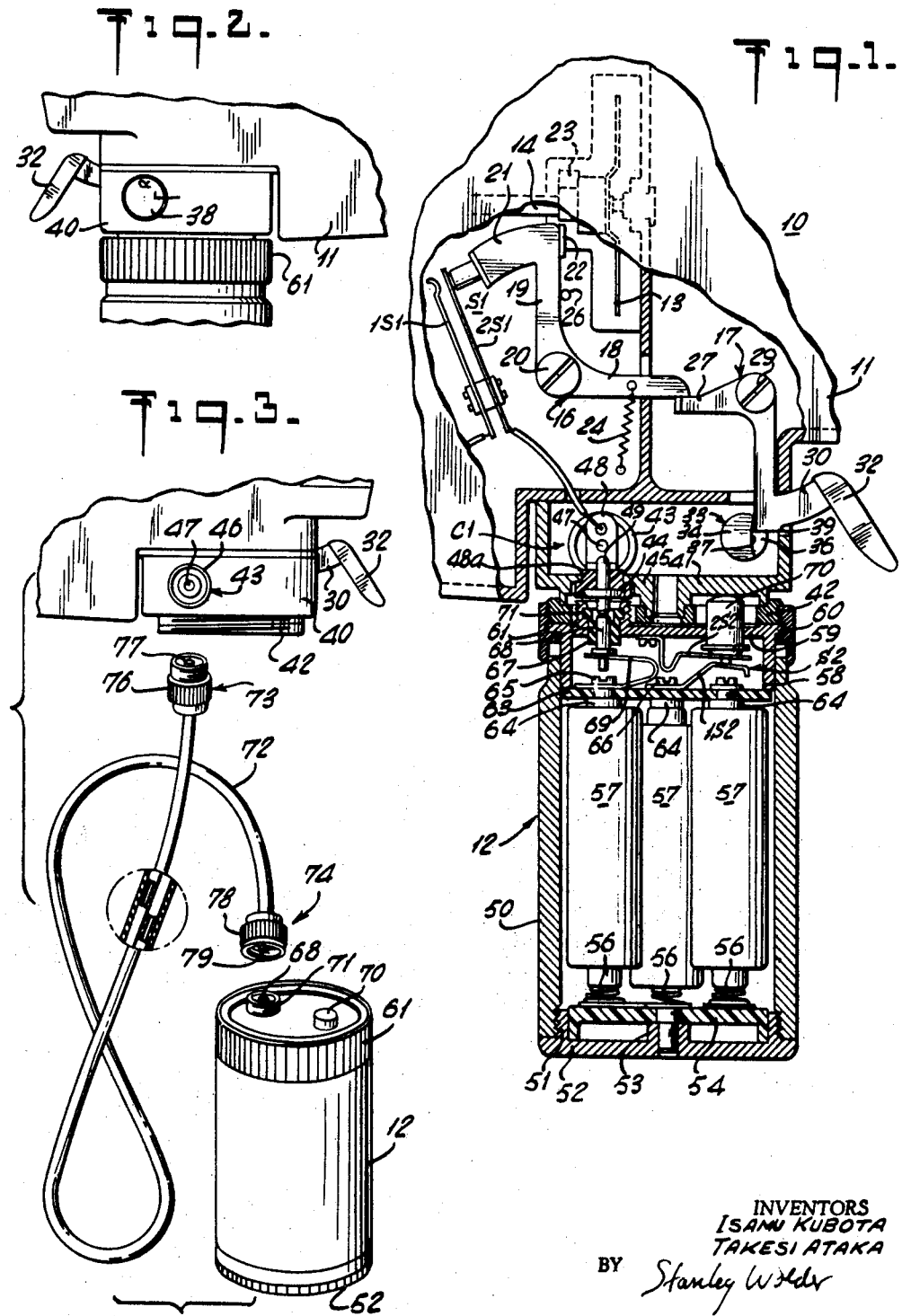

United States Patent Office 3,187,341
Patented June 1, 1965

3,187,341
BATTERY POWERED MOTION PICTURE CAMERA WITH REMOTE CONTROL
Isamu Kubota, Hirakata City, and Takesi Ataka, Sumiyosiku, Osaka, Japan, assignors to Minolta Camera Co. Ltd., Osaka, Japan, a corporation of Japan
Filed Dec. 5, 1962, Ser. No. 242,407
9 Claims. (Cl. 352—174)

The present invention relates generally to improvements in cameras and it relates more particularly to an improved electric motor driven motion picture camera.

While the amateur type motion picture camera is usually provided with a spring wound motor for driving the shutter mechanism it has been a common expedient to drive the shutter mechanism by a battery energized electric motor. However, the battery energized electric motor driven motion picture cameras heretofore proposed and available possess numerous drawbacks and disadvantages. They are generally of awkward and bulky construction, are of limited versatility and otherwise leave much to be desired.

It is therefore a principal object of the present invention to provide an improved motion picture camera.

Another object of the present invention is to provide a motion picture camera provided with an improved battery energized electric motor driven shutter mechanism.

Still another object of the present invention is to provide and improved electric motor driven motion picture camera which may be selectively locally and remotely controlled.

A further object of the present invention is to provide an improved electric motor driven motion picture camera in which energy source is an electric battery housed in a hand grip separably mounted to the camera.

Still a further object of the present invention is to provide an improved camera of the above nature characterized by its compactness, versatility, reliability and convenience of use.

The above and other objects of the present invention will become apparent from a reading of the following description taken in conjunction with the accompanying drawing, wherein:

FIGURE 1 is a fragmentary side elevational view partially in section, of a motion picture camera embodying the present invention, the battery housing handle being shown in its camera mounted position;

FIGURE 2 is an opposite side fragmentary elevational view thereof;

FIGURE 3 is a side elevational view of the camera in handle separated position, the handle and coupling cable being shown separately in perspective and the cable being illustrated partially in enlarged section;

FIGURE 4 is a diagram of the motor electric control circuit network in the handle attached position; and FIGURE 5 is a diagram thereof in the remote control handle detached position.

In a sense the present invention contemplates the provision of a motion picture camera comprising a body member, a shutter member located in said body member, an electric drive motor connected to said shutter member, a battery housing handle separably mounted on said body member, a first switch mounted on said handle member, and means connecting said motor through said first switch to said battery.

According to a preferred form of the present invention the handle member is in the form of a cylindrical housing provided at its top with an internally threaded rotatable collar which engages a mating threaded section depending from the camera body member. The first switch is normally open and is located at the top of the handle and is provided with an upwardly directed actuating button which is depressed by the body member to close the switch when the handle is attached. An electrical coupler is also located at the top of the handle and is connected to the battery by way of the first switch. Another electrical coupler is carried by the body member and releasably engages the handle carried coupler when the handle is attached to the body member. A second normally open switch is located in the body member and the motor is connected to the electrical coupler through the second switch. There are provided finger actuated means for selectively closing the second switch and means for releasably locking it in closed position. Also included is a remote control electric cable terminating in coupling members which can releasably engage the handle and body member electrical couplers when the handle is detached. The body member is provided with a threaded socket for engaging a tripod screw. The above described camera is highly compact, versatile and convenient, and permits the remote control of the shutter drive mechanism.

Referring now to the drawing which illustrates a preferred embodiment of the present invention, the reference numeral 10 generally designates the improved camera which includes a main body member 11 and a battery housing detachable handle member 12. The body member 11 is provided with the conventional lens and film advancing system and includes a rotatable shutter member 13, suitably positioned, affixed to a shaft 14 which is connected to an electric drive motor M located in the body member 11. A switch S1 disposed in the body member 11 includes a pair of insulator supported relatively stationary first and movable second parallel upwardly directed resilient switch arms 1S1 and 2S1 respectively the arm 1S1 being connected to one terminal of the drive motor M the other terminal of which is grounded to the body member 11 which is formed of metal.

The switch S1 is normally open and may be closed by way of a pair of Z-shaped levers 16 and 17 respectively. The lever 16 includes a rearwardly directed arm 18 and an upwardly directed arm 19 pivoted at their elbow to the body member 11 by a pin 20, the arm 19 terminating in a rearwardly directed leg 21 which carries at its free end a projecting insulator member bearing upon the free end of the switch arm 2S1. A stop or brake member 22 is located at the upper forward edge of the lever arm 19 and when the lever 16 is retracted the stop 22 is located in the path of a detent 23 located on shaft 14 to prevent the rotation thereof, and when the lever 16 is advanced to a switch closed position the stop 22 is outside the path of the detent 23. The lever 16 is urged clockwise to its retracted position by a tension spring 24 connected between the arm 18 and a lower part of the body member 11 and its clockwise movement is limited by a body mounted abutment 26 confronting the front face of the arm 19. The second lever 17 includes a forwardly directed arm 27 and a depending arm 28 pivoted at their elbow by a pin 29 to the body member 11, the free end of the arm 27 engaging the underside of the free end of the arm 18. Projecting forwardly from the lower end of the arm 28 and through an opening in the front wall of the body member 11 is an arcuate arm 30 terminating in a depending finger piece 32. The lever 17 is normally urged counterclockwise by the spring loaded lever 16 to advance the finger piece 32 forwardly, and depression of the finger piece 32 effects the swinging of the lever 16 counterclockwise to release the shutter 13 and close the switch S1.

In order to selectively lock the levers 16 and 17 in switch closed or open position or to release the levers there is provided a cylindrical latching member 33 having on the inner end face thereof a raised section 34 and a depressed section 36 separated by a shoulder 37. The latching member 33 projects through the wall of the body member 11 and terminates in a manipulating knob 38. The shoulder 37 when in its vertical forwardly directed position engages the rear face of the arm 28 to lock the levers 16 and 17 in the retracted switch open position; when in its horizontal position it releases the levers for free movement, and when the finger piece 32 is depressed and the latching member 33 is rotated to bring the shoulder 37 to a rearwardly directed position it engages an abutment 39 depending from the trailing part of the arm 30 to releasably lock the levers 16 and 17 in advanced switch closed positions.

Located on the bottom front wall of the body member 11 is a cylindrical coupling section 40 which includes a circular bottom wall 41 provided with an axially depending tapped tubular member 45 for engagement by a corresponding coupling screw to facilitate the mounting of the camera. Suitably rigidly affixed to the underface of the wall 41 is a circular plate 42 threaded on its outer peripheral surface and provided with a central opening registering with the tubular member 45. A first electrical coupler C1 is carried by the coupling section 40 and includes a coupling unit 43 mounted on the peripheral wall of the section 40 and a coupling unit 44 mounted on the wall 41 and registering with an opening in the plate 42. The coupling unit 43 is illustrated as of the coaxial type and includes an outwardly projecting internally threaded collar 46 grounded to the body member 11 and a coaxial pin electrode 47 insulated from the collar 46. The electrode 47 is provided at its inner end with a terminal 48 which is electrically connected to the switch arm 2S1. The coupling unit 44 includes an insulator bushing 48a in engagement with an opening in the wall 41 and carrying an axial vertical pin electrode 49 having an upper end engaging the terminal 48 and a lower section depending below the wall 41.

The handle member 12 comprises a cylindrical tubular housing peripheral wall 50 which is internally threaded at its lower end to releasably engage a threaded upstanding peripheral flange 51 formed on the inner face of a cover plate 52. Projecting upwardly from the cover 52 is a coaxial tubular standoff 53 which rotatably engages a pin depending from an insulator disc 54 provided with elements (not shown) releasably engaging corresponding recess on the wall 50 to properly orient the disc 54. Compression springs 56 project upwardly from the disc 54 and are interconnected in any well known fashion so that when battery cells 57 are housed in the handle 12 in suitably delineated wells the negative and positive terminals of pairs of cells are connected.

Nested in and affixed to the top of the cylindrical wall 50 is a metal sleeve 58 projecting above the wall 50 and surmounted by a top wall 59 which projects peripherally beyond the sleeve 58 to define a peripheral flange 60. A coupling collar 61 is rotatably engaged by the flange 60 which registers with a corresponding groove formed in the inner face of the collar 61. The collar 61 is internally threaded at its upper end and engages the corresponding thread on the plate 42 to separably attach the handle 12 to the body member 11. A partition panel 63 of insulating material is disposed below the lower edge of the sleeve 58 and carries four contact elements 64 on its under face which engage the confronting terminals of the battery cells 57. A pair of the elements 64 are connected to cooperate with the spring assembly 56 to connect the cells 57 in series and the other pair of contact elements 64 are connected to terminals 65 and 66 respectively. An insulator bushing 67 engages an opening formed in the wall 59 in alignment with the terminal 65 and slidably engages a coaxial pin electrode 68 which projects below the bushing. A hairpin shaped spring 69 has one arm connected to the terminal 65 and an opposite arm engaging and bearing on the underface of a flange formed on the lower section of the electrode 68 to resiliently urge it upwardly into engagement with the electrode 49 when the handle 12 is in attached position and to electrically connect it to the terminal 65.

A second switch S2 is housed in the upper part of the handle 12 and includes a relatively stationary lower first resilient switch arm 1S2 having a lower end engaged by and connected to the terminal 66. A second relatively movable resilient switch arm 2S2 has an end affixed and electrically connected to the wall 59 and a free end disposed above and confronting the free end of the switch arm 1S2 and provided with a contact element directed toward the arm 1S2. A push button 70 slidably engages a mating opening in the wall 59 and bears upon the upper face of the switch arm 2S2. The button 70 projects above the wall 59 and through an enlarged opening in the plate 42. It should be noted that when the handle 12 is attached to the body member 11 the wall 41 bears on and depresses the button 70 to urge the arm 2S2 into contact with arm 1S2 and hence close the switch S2. On the other hand, when the handle 12 is separated from the body member 11 to release the button 70 and permit the raising of switch arm 2S2 the switch S2 returns to its normally open position.

Directed upwardly from the wall 59 and surrounding the bushing 67 is an externally threaded sleeve 71 coaxial with the electrode 68. In order to permit the remote control of the shutter drive motor there is provided a two conductor cable 72 provided with coupling elements 73 and 74 respectively at opposite ends thereof. The coupling element 73 includes a rotatable externally threaded sleeve 76 mating the threaded collar 46 and a coaxial pin electrode 77 and the coupling element 74 includes a rotatable internally threaded collar 78 mating the sleeve 71 and a coaxial pin electrode 79. The pins 77 and 79 are interconnected by one of the cable conductors and the collar and sleeve 78 and 76 are connected by the other cable conductor.

Considering now the operation of the camera described above, when the handle 12 is attached to the body member 11 as illustrated in FIGURES 1 and 4 the switch S2 is closed by the depressed button 70 to ground the positive terminal of the battery 57 to the body member which in turn is connected to one terminal of the motor M, the other terminal being connected to switch arm 1S1. The negative terminal of the battery is connected through engaging pin electrodes 49 and 68 and the associated elements to the switch arm 2S1. Upon depression of the finger piece 32 the levers 16 and 17 are advanced to disengage the detent 23 and close the switch S1 completing the circuit from the battery 57 to the motor M thereby energizing the motor M and driving the shutter 13. Upon release of the finger piece 32 the levers 16 and 17 are retracted to open the switch S1 and deenergize the motor M and effect the engagement of detent 23 by stop member 22.

In order to remotely control the shutter drive motor, the handle 12 is detached from the body member 11 by unscrewing the collar 61, the separation of the handle 12 releasing the switch S2 to its open position. The cable coupling elements 73 and 74 are screwed into engagement with the corresponding coupling element 43 and the coupling element defined by the pin electrode 68 and sleeve 71. The finger piece 32 is depressed and locked in the depressed position by rotating the latching member 33 to lock the switch S1 in closed position and release the shutter shaft 14. In the aforesaid position the negative terminal of the battery is connected to one terminal of the motor M by way of the cable 72 and closed switch S1 and the positive terminal of the battery is connected through the normally open switch S2, the cable 72 and the body member 11 to the other terminal of the motor M. Thus by finger depressing the button 70 the switch S2 is closed to complete the motor battery circuit and energize the motor to thereby drive the shutter 13. Upon release of the button 70 the switch S2 opens and the motor M deenergizes.

While there has been described and illustrated a preferred embodiment of the present invention it is apparent that numerous alterations, omissions and additions may be made without departing from the spirit thereof.

What is claimed is:
1. A motion picture camera comprising a body member, a shutter member located in said body member, an electric drive motor connected to said shutter member, a battery housing handle member separably mounted on said body member, a first switch mounted on said handle member, means for releasably locking said first switch in a closed position when said handle is mounted on said body member and means connecting said motor through said first switch to said battery.

2. A motion picture camera comprising a body member, a shutter member located in said body member, an electric drive motor connected to said shutter member, a battery housing handle member separately mounted on said body member, a first switch mounted on said handle member, means for releasably locking said first switch in a closed position when said handle is mounted on said body member, a second switch mounted on said body member, and means connecting said motor through said first and second switches connected in series to said battery.

3. The motion picture camera of claim 2 wherein said second switch is normally open, and including finger actuated means mounted on said body member for selectively closing said second switch, and means for releasably locking said second switch in its closed position.

4. The motion picture camera of claim 2 including means breaking said shutter member with the opening of said second switch.

5. A motion picture camera comprising a body member, a shutter member located in said body member, an electric drive motor connected to said shutter member, a first electrical coupler mounted on said body member, a battery housing handle depending from and separably attached to said body member, a second electrical coupler mounted on said handle and releasably engaging said first coupler when said handle is attached to said body member, a first normally open switch mounted on said handle means connecting said second coupler through said first switch to said battery, a second switch located in said body member and means connecting said drive motor through said second switch to said first electrical coupler.

6. The motion picture camera of claim 5 including an elongated electrical cable terminating in coupling members connected respectively to said first and second couplers when said handle is separated from said body member.

7. The motion picture camera of claim 5 wherein said first switch is normally open and including a button member mounted at an end of said handle and engaging said first switch and movable between a raised and depressed position with the opening and closing respectively of said first switch and means on said body member engaging and depressing said button when said handle is attached thereto.

8. The motion picture camera of claim 5 including an internally threaded collar rotatably mounted atop said handle member and a mating externally threaded member depending from said body member and engaging said collar.

9. The motion picture camera of claim 5 wherein said second switch is normally open and including finger actuated means for selectively closing said second switch and means for releasably locking said second switch in closed position.

References Cited by the Examiner
UNITED STATES PATENTS 1,691,419 11/28 Willard _____ 352—180
2,928,315 3/60 Broido.
3,062,091 11/62 Akahane _____ 352—176

FOREIGN PATENTS 837,995 11/38 France.

NORTON ANSHER, *Primary Examiner.*

WILLIAM MISIEK, *Examiner.*